United States Patent [19]

Lindell

[11] Patent Number: 5,812,940
[45] Date of Patent: Sep. 22, 1998

[54] REDUCING INTERFERENCE FROM OSCILLATORS IN ELECTRONIC EQUIPMENT

[75] Inventor: Karl Bo Lindell, Lidingö, Sweden

[73] Assignee: Ericsson Inc., Research Triangle Park, N.C.

[21] Appl. No.: 862,319

[22] Filed: May 23, 1997

Related U.S. Application Data

[63] Continuation of Ser. No. 230,916, Apr. 21, 1994, abandoned.

[51] Int. Cl.$^6$ .................................................. H04B 1/10
[52] U.S. Cl. .......................... 455/114; 455/63; 455/317; 375/346
[58] Field of Search .................................... 455/317, 114, 455/116, 296, 295, 183.1, 63, 310, 226.1, 115, 91, 110, 76, 50.1, 501; 375/99, 103, 1, 96, 296, 346, 354, 357; 332/123, 107, 159; 331/178, 177 R, 105

[56] References Cited

U.S. PATENT DOCUMENTS

| | | | |
|---|---|---|---|
| 3,354,410 | 11/1967 | Beuscher | 455/63 |
| 3,496,470 | 2/1970 | Richardson | 325/158 |
| 3,617,892 | 11/1971 | Hawley | 455/110 |

(List continued on next page.)

FOREIGN PATENT DOCUMENTS

| | | |
|---|---|---|
| 0 163 313A3 | 12/1985 | European Pat. Off. . |
| 0 326 643 A3 | 8/1989 | European Pat. Off. . |
| 2 128 828 | 5/1984 | United Kingdom . |
| WO90/00839 | 1/1990 | WIPO . |
| WO90/14710 | 11/1990 | WIPO . |

OTHER PUBLICATIONS

Patent Abstracts of Japan, vol. 014 No. 558 (P–1141), published on Dec. 12, 1990, corresponding to Japanese Patent Document No. JP–2239309, published on Sep. 21, 1990.

T. Mor and M. Reznik, "Frequency Modulator of Reference Oscillator", *Motorola Technical Developments,* vol. 12, pp. 24–25, Apr. 1991.

Japanese Pub. No. 61–95651 (A), to Yoshifumi Tateda on May 5, 1986.

Japanese Pub. No. 60–229544, to Ichiro Kubota et al. on Nov. 14, 1985.

RF Design, Apr. 1991, "Designing a Direct Sequence Spread Spectrum Secure Communication System", p. 31.

Hewlett Packard Journal, Sep. 1980, "Automatic Measurements with High Performance Universal Counter", pp. 21–31.

*Primary Examiner*—Reinhard J. Eisenzopf
*Assistant Examiner*—Lee Nguyen
*Attorney, Agent, or Firm*—Burns, Doane, Swecker & Mathis, L.L.P.

[57] ABSTRACT

In an electronic apparatus including a reference oscillator and an interfering part that generates an interference signal having a spectral component within a receiver bandwidth, the reference oscillator supplying a reference oscillating signal to the interfering part from which reference oscillating signal the interference signal is derived, amplitude of the interference signal within the receiver bandwidth is reduced by angle modulating the reference oscillating signal with a sinusoidal signal to generate an angle modulated interference signal having a reduced carrier amplitude and modulation sidebands that are outside of the receiver bandwidth. The angle modulated interference signal preferably has a modulation index, $\beta$, that is close to a solution of the equation $J_0(\beta)=0$, where $J_0$ is a Bessel function of the first kind. Angle modulation may alternatively be accomplished by applying direct frequency modulation to the reference oscillator with the sinusoidal signal to generate a modulated reference signal and then applying the modulated reference signal to the interfering part, or by phase modulating the reference oscillating signal with the sinusoidal signal prior to supplying it to the interfering part. Where the interference signal has an interfering spectral component within a measurement bandwidth, the amplitude of the interfering spectral component is reduced by using a deterministic, non-noise modulating signal, such as a sawtooth waveform modulating signal, to angle modulate a clock signal from which the interference signal is derived.

13 Claims, 8 Drawing Sheets

U.S. PATENT DOCUMENTS

| | | | |
|---|---|---|---|
| 4,035,727 | 7/1977 | Ishii | 325/184 |
| 4,247,939 | 1/1981 | Stromswold et al. | 375/1 |
| 4,425,661 | 1/1984 | Moses et al. | 375/1 |
| 4,466,107 | 8/1984 | Stoner | 375/37 |
| 4,507,796 | 3/1985 | Stumfall | 375/357 |
| 4,545,072 | 10/1985 | Skutta et al. | 455/183 |
| 4,745,566 | 5/1988 | Ciardi | 364/718 |
| 4,811,425 | 3/1989 | Feerst | 455/317 |
| 4,870,699 | 9/1989 | Garner et al. | 455/76 |
| 4,888,788 | 12/1989 | Teranishi et al. | 375/1 |
| 4,977,607 | 12/1990 | Maucksch et al. | 455/10 |
| 5,128,957 | 7/1992 | Nakagawa | 375/1 |
| 5,148,447 | 9/1992 | Ito | 375/7 |
| 5,179,728 | 1/1993 | Sowadski | 455/183.1 |
| 5,225,792 | 7/1993 | Prakash | 331/158 |
| 5,239,686 | 8/1993 | Downey | 455/78 |
| 5,263,055 | 11/1993 | Cahill | 375/99 |
| 5,281,930 | 1/1994 | Taromaru et al. | 332/127 |

REDUCING INTERFERENCE FROM OSCILLATORS IN ELECTRONIC EQUIPMENT

This application is a continuation of application Ser. No. 08/230,916, filed Apr. 21, 1994, now abandoned.

BACKGROUND

The present invention relates to oscillators and clocks in electronic equipment, and more particularly to methods and apparatuses for reducing unwanted electromagnetic emissions from such oscillators and clocks.

Modern electronic equipment relies heavily on the use of clocks and oscillators. Examples of such equipment are personal computers, household electronics and appliances (that now typically include microprocessors and digital circuits), telephone exchanges, radio equipment (including cellular telephones), and any apparatus having a power supply that utilizes switching, to name just a few.

One characteristic of oscillators and clocks is the production of unwanted emission of electromagnetic energy that can create problems not only for other nearby equipment, but also for surrounding circuits within the same piece of equipment as the oscillators and clocks. For example, within a radio receiver, an oscillator in a surrounding circuit can create interference in the radio receiver by emitting unwanted signals at a frequency where the receiver is sensitive to interference, such as the intended receive channel or at an intermediate frequency in a superheterodyne receiver. (As used in this specification, the word "interference" may refer to either radiated or conducted interference.) In many radio designs, all of the internally used oscillator frequencies are derived from a single high accuracy reference oscillator, which can produce interference at fundamental, harmonic and subharmonic frequencies of the oscillator. It might be impractical or impossible to detune the oscillator to avoid this interference, because the frequency error of the oscillator will be too large for its purpose. This is often the case in cellular radios and associated base stations as well as in many other radio designs.

One known solution to the problem of reducing harmonic interference generated by a clock signal in a radio transceiver is disclosed in U.S. Pat. No. 5,263,055, issued to Cahill on Nov. 16, 1993. This patent shows the use of a frequency spreading signal generator and a signal modulator. The frequency spreading signal is produced by a pseudorandom noise generator, and has the properties of white noise. The signal modulator modulates the clock signal with the frequency spreading signal to produce a modulated clock signal including a modulated harmonic frequency component. This results in the power level of a modulated harmonic frequency component, corresponding to the harmonic frequency component interfering with the filtered signal, to be spread over a frequency bandwidth greater than the predetermined frequency bandwidth, thereby causing the power level of the modulated harmonic frequency component within the predetermined frequency bandwidth to decrease.

Japanese Patent Document No. 61-95651, published on May 14, 1986, appears to disclose a system very similar to that of the Cahill patent. In a radio receiver, a reference signal having a center frequency $f_0$, which is used as a timing signal within the receiver, is subjected to angular modulation by a noise signal outputted from a modulation source. When the center frequency of the signal to be received is sufficiently larger than the reference signal frequency $f_0$, the frequency spectrum of the n-th harmonic causing interruption spread widely and the interference is reduced remarkably.

A problem with the above techniques disclosed by both the Cahill and Japanese Patent documents is that the use of a noise signal to spread the harmonics of the reference signal does not provide the capability for completely eliminating all sidebands within a receiver bandwidth. (In this context, receiver bandwidth means the frequency band around an assigned channel frequency, in which interfering signals might impair reception when the receiver is tuned to the channel.) At best, these sidebands can be somewhat attenuated, the amount of attenuation being equivalent to the ratio of receiver bandwidth to spreading bandwidth.

Another drawback to these systems is the fact that noise generators are themselves, complicated to implement, making the circuit more costly to design and build.

Similar unwanted emission problems occur in other types of electronic equipment that contain oscillators and clocks with a defined constant frequency. In such equipment, it is often the case that many other signals are derived from the clock or oscillator signal in such a way that unwanted emission occurs in the form of a line spectrum, covering a large bandwidth. There are often dominant components in the emitted spectrum at multiples of the clock frequency or multiples of subharmonics of the clock frequency. The exact position and amplitude of the components may vary with the state of the equipment, but the dominant lines still remain.

Because of potential coexistence problems between various clock- and oscillator-based systems, such equipment is required to satisfy national and international standards regarding electromagnetic compatibility (EMC). These standards define a maximum level of electromagnetic radiation that any piece of electronic equipment is allowed to radiate. Unwanted emission is often measured, in accordance with technical standards, using a quasipeak detector with a bandwidth of 120 kHz. A line in the emitted spectrum will give an output from the detector corresponding to its amplitude. If several lines are within the bandwidth of the detector, then the output will roughly be the sum of their amplitudes.

In electronic circuits, unwanted emission is traditionally kept below maximum limits by means of careful design of circuit boards, decoupling and screening, use of balanced lines, low power levels, and other commonly known design principles. However, these techniques are often inadequate at reducing the unwanted emissions to an acceptable level.

Therefore, it is desirable to provide a method and apparatus that can attenuate unwanted clock and oscillator emission of electromagnetic energy to a level that avoids interference with other nearby circuits and equipment.

It is also desirable to provide a method and apparatus that can attenuate unwanted clock and oscillator emission of electromagnetic energy to a level that satisfies various national and international standards regarding such emission.

SUMMARY

One aspect of the present invention finds application in an electronic apparatus including a reference oscillator and an interfering part that generates an interference signal having a spectral component within a receiver bandwidth, the reference oscillator supplying a reference oscillating signal to the interfering part from which reference oscillating signal the interference signal is derived. In accordance with the invention, the amplitude of the interference signal within the receiver bandwidth is reduced by angle modulating the reference oscillating signal with a sinusoidal modulating signal, whereby the interfering part generates an angle modulated interference signal having modulation sidebands that are outside of the receiver bandwidth and a reduced carrier component within the receiver bandwidth.

In a preferred embodiment of the invention, the sinusoidally modulated interference signal has a modulation index, $\beta$, that is close to a solution of the equation $J_0(\beta)=0$, where $J_0$ is a Bessel function of the first kind. A satisfactory value of $\beta$ may be one that sufficiently reduces carrier voltage of the modulated interference signal to a level that produces an acceptable amount of receiver interference. The modulating signal frequency is selected so that the modulation sidebands fall outside of the receiver bandwidth. A modulation frequency exceeding the receiver bandwidth will serve the purpose wherever within the bandwidth the interfering carrier falls. Half the bandwidth is sufficient if the carrier falls exactly in the center of the bandwidth.

Angle modulation may be accomplished by applying direct frequency modulation to the reference oscillator with the sinusoidal modulating signal to generate a modulated reference signal, and then applying the modulated reference signal to the interfering part to generate the angle modulated interference signal having spectral components that are outside of the receiver bandwidth. Alternatively, angle modulation may be performed by phase modulating the reference oscillating signal with the sinusoidal modulating signal prior to supplying it to the interfering part so that the interfering part generates the angle modulated interference signal having modulation sidebands that are outside of the receiver bandwidth. When this latter method is used, the unmodulated reference oscillating signal may be supplied to a non-interfering part of the electronic apparatus. This is useful when it is desired to supply a non-modulated signal to the non-interfering part.

Another aspect of the present invention finds application in an electronic apparatus including an oscillator that generates an interference signal having an interfering spectral component within a measurement bandwidth. In accordance with the invention, interference is reduced by using a deterministic, non-noise modulating signal, such as a sawtooth waveform modulating signal, to angle modulate a clock signal from which the interference signal is derived, so as to cause the interference signal to become an angle modulated interference signal having a reduced spectral component within the measurement bandwidth, the reduced spectral component being smaller than the interfering spectral component.

The step of angle modulating a clock signal from which the interference signal is derived may comprise the steps of applying direct frequency modulation to a reference clock that generates the reference clock signal, and then supplying the frequency modulated clock signal to an emission generating circuit within the electronic apparatus in lieu of the clock signal, the emission generating circuit being responsible for generation of the interference signal. Alternatively, the step of angle modulating a clock signal from which the interference signal is derived may comprise phase modulating the clock signal, and then supplying the phase modulated clock signal to an emission generating circuit within the electronic apparatus in lieu of the clock signal, the emission generating circuit being responsible for generation of the interference signal.

In accordance with one embodiment of this aspect of the invention, a modulation bandwidth of the angle modulated interference signal exceeds the measurement bandwidth.

In yet another aspect of the invention, in which a clock circuit itself generates a combined signal comprising an interference signal in addition to the desired clock signal, interference may be reduced by angle modulating the combined signal as described above.

BRIEF DESCRIPTION OF THE DRAWINGS

The objects and advantages of the invention will be understood by reading the following detailed description in conjunction with the drawings in which.

DETAILED DESCRIPTION

Several aspects of the present invention will now be described with respect to a number of embodiments. First, several embodiments that are capable of reducing radio receiver interference from an oscillator will be presented. Next, several embodiments of the invention will be described that are capable of attenuating unwanted emissions from a clock or oscillator to levels that satisfy national and international standards regarding such emission. In all instances, angle modulation is applied to the oscillator signal to effect the reduction of unwanted emission.

Figure 1:
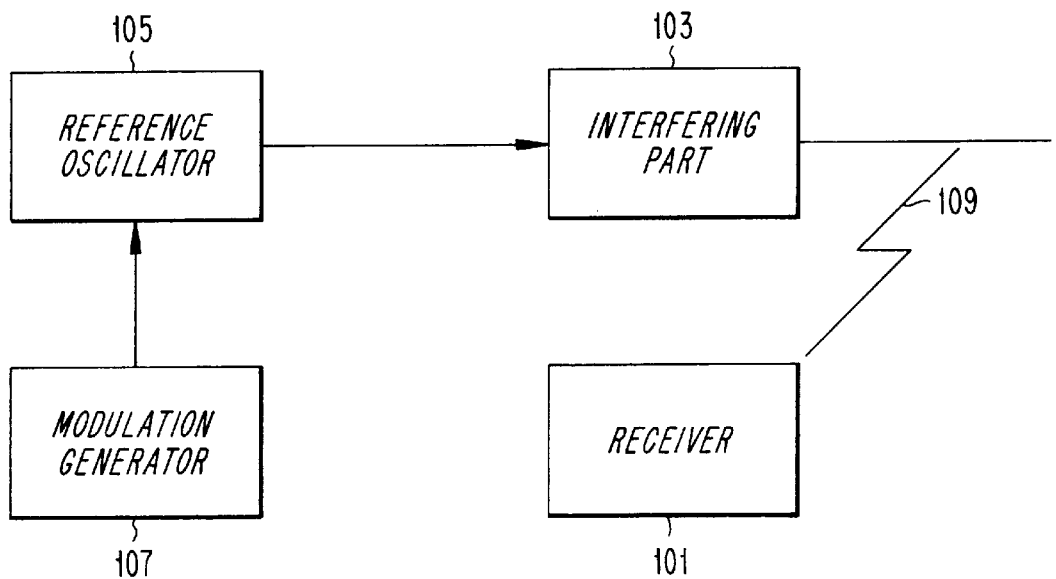
FIG. 1 is a block diagram of electronic equipment that includes a first embodiment in accordance with a first aspect of the invention.

Referring now to FIG. 1, a block diagram of electronic equipment that includes a first embodiment of the invention is shown. The electronic equipment may, for example, be radio equipment, including a receiver 101. In this example, it is desired to prevent the interfering part 103, which may be a control logic circuit, from generating a strong interfering signal 109 at a receive frequency of the receiver 101. For purposes of this example, it will be assumed that the receive frequency is 422.4 MHz, and that the interfering part 103 uses a 6.4 MHz clock signal derived from the reference oscillator 105, which oscillates at a frequency of 12.8 MHz. Consequently, there is the potential that the interfering part 103 will generate an interfering signal comprising the 66th harmonic of the clock frequency. It will be recognized by those having ordinary skill in the art that although the reference oscillator 105 and the interfering part 103 may be separate parts, as illustrated, they may alternatively be one and the same part. That is, it is possible for a reference oscillator to also generate unwanted harmonics that cause interference in a receiver bandwidth. However, solely for the purpose of illustrating the various features of the invention, the following discussion treats the reference oscillator 105 and the interfering part 103 as separate entities. Notwithstanding this treatment, the principles and techniques discussed here are equally applicable to the case where a reference oscillator itself generates an unwanted interference signal.

In accordance with the invention, the interfering signal is sharply attenuated by applying angle modulation to the reference oscillator 105. As depicted in FIG. 1, the angle modulation is effected by means of direct frequency modulation of the reference oscillator 105. This technique is equally applicable for the case where the reference oscillator 105 and the interfering part 103 are one and the same, as mentioned above. Techniques for frequency modulating an oscillator are well known in the art, and are not described here in detail. Those having ordinary skill in the art will recognize that the same angle modulation could alternatively be accomplished by applying phase modulation to the output of the reference oscillator 105. In either case, the modulating signal is chosen to be a deterministic, non-noise signal (as opposed to random or pseudo-random signals having the characteristics of white noise), preferably sinusoidal, that will produce a modulated signal having a modulation index that will cause the carrier frequency signal at the receive frequency to be small. The choice of a deterministic non-noise modulating signal, such as the sinusoidal waveform, instead of a waveform having white noise characteristics, allows the invention to achieve a greater attenuation within a certain bandwidth centered around the interfering harmonic frequency. This is because sinusoidal modulation can be made to cause all sidebands to fall outside of a given bandwidth. By comparison, the use of white noise as the modulating signal only permits an attenuation equivalent to the ratio of receiver bandwidth to spreading bandwidth. Thus, the present, invention permits substantial attenuation to be achieved with significantly smaller modulation when the correctly chosen modulating signal is chosen.

The sinusoidal modulating signal should be selected so that the modulation index of the modulated signal will be close to the solutions to the equation $J_0(\beta)=0$, where $\beta$ is the modulation index and $J_0$ is the Bessel function of the first kind. For example, in a preferred embodiment the modulation index, $\beta$, is selected (e.g., from a table of Bessel functions) so that it satisfies the relation $J_0(\beta) \leq R$, where R is the desired ratio of the reduced carrier voltage level of the modulated signal to the carrier voltage level of the unmodulated signal. As an example, if R=0.1 (equivalent to 20 dB reduction), a value of $\beta$ between 2.2 and 2.4 at the interfering frequency is satisfactory. Those having ordinary skill in the art will recognize that an acceptable value for R depends on the susceptibility of the particular receiver to interference. Furthermore, a modulation frequency is selected that will produce modulation sidebands outside of the receiver frequency bandwidth. In the example shown in FIG. 1, the interfering signal 109 will be reduced by using the modulation generator 107 to modulate the output of the reference oscillator 105 by applying a modulating signal having a modulation index of 2.4 at 422.4 Mhz, and a modulation frequency of 60 kHz, giving modulation sidebands outside of the receiver bandwidth of 8 kHz. This attenuation results from the fact that at certain modulation indexes (e.g. in the vicinity of 2.4), the spectral component of the modulated signal at the unmodulated carrier frequency vanishes. The modulation index at 6.4 MHz is only 2.4/66=0.0364, which is too small to cause malfunction in the control logic circuit (i.e., the interfering part 103).

It should be recognized in the above example that the selection of 60 kHz as the modulation frequency is arbitrary. Any frequency above the receiver bandwidth might be used. For instance., in the above example an 8 kHz modulation frequency would also be acceptable.

Figure 2A:
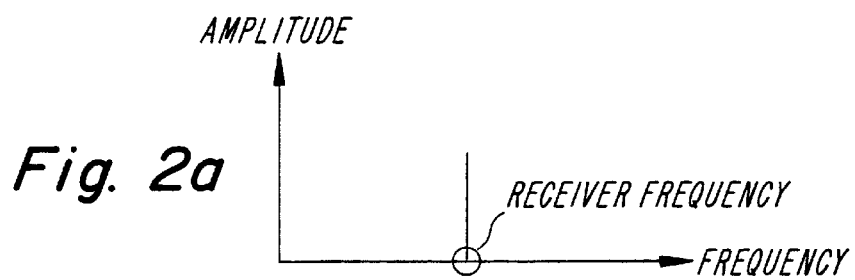
FIGS. 2a–b are graphical comparisons of emission levels produced by a circuit with and without the use of techniques in accordance with the first aspect of the invention.
Figure 2B:
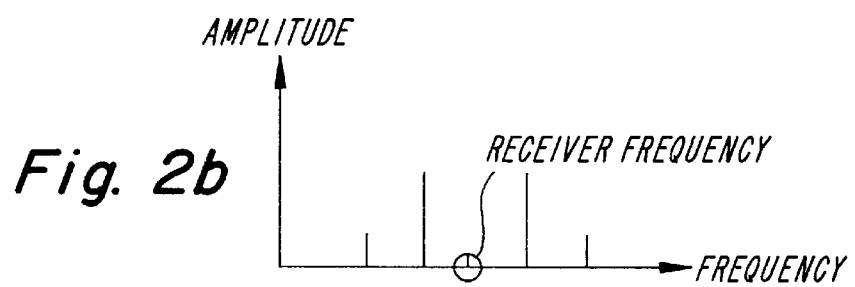

FIG. 2a is a graph that illustrates the interfering signal 109 that would result without the modulation of the oscillator, and FIG. 2b is a graph showing the effect of the inventive modulation technique on the interfering signal 109. It is readily apparent that the strength of the interfering signal at the receive frequency has been greatly reduced.

Figure 3:
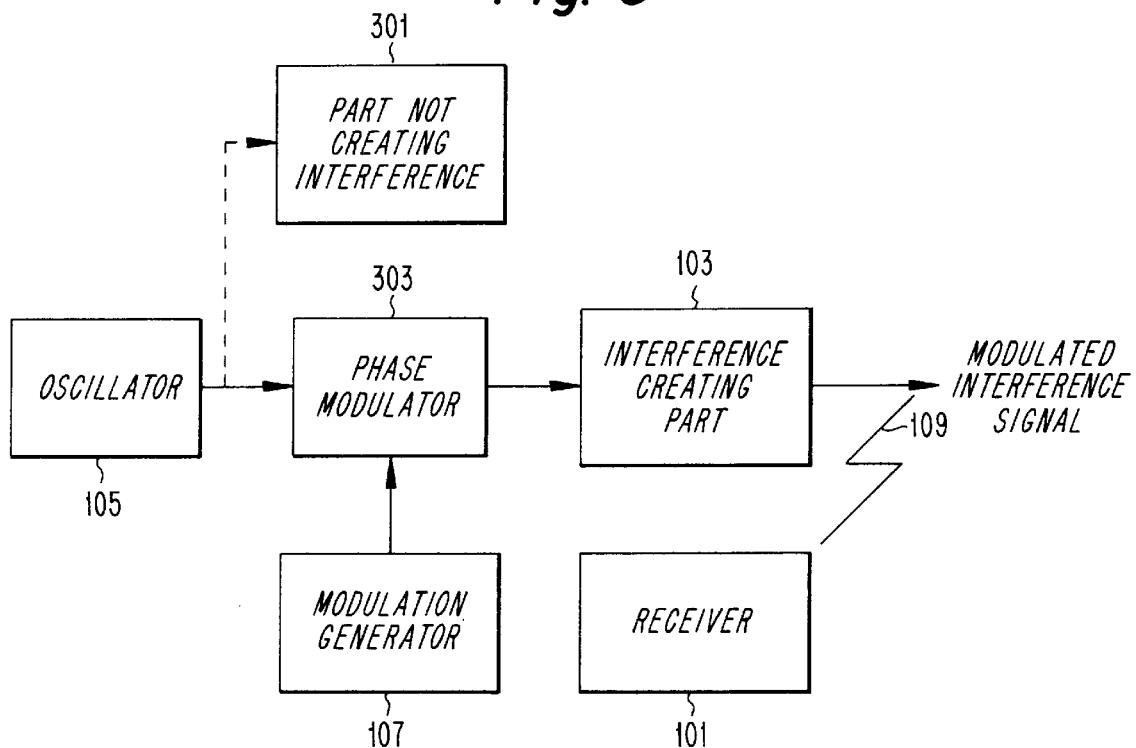
FIG. 3 is a block diagram of an alternative embodiment in accordance with the first aspect of the invention.
Figure 9:
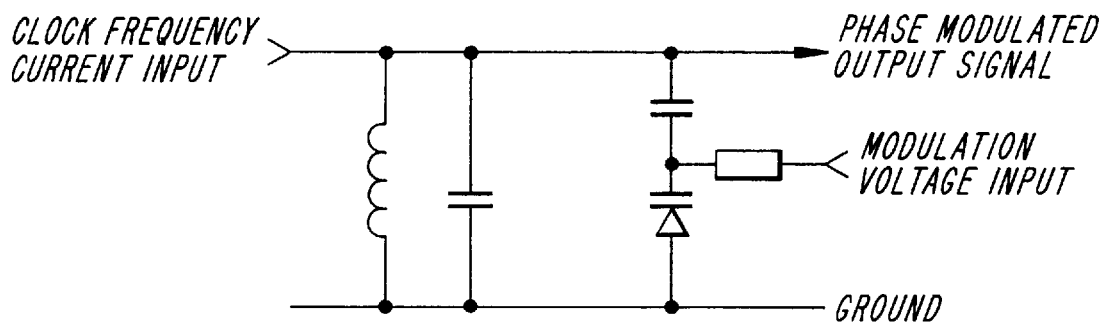
FIG. 9 is a diagram of a prior art phase modulator circuit.

An alternative embodiment of the above-described invention is illustrated in FIG. 3. Here, the concern is still that the interference creating part 103 will generate an interference signal 109 at the receive frequency of a receiver 101. However, the electronic equipment also includes a non-interfering part 103 for which it is desired to supply a non-modulated signal directly from the oscillator 105. Consequently, it is not feasible to directly apply frequency modulation to the reference oscillator 105. To accommodate this situation, the output of the oscillator 105 is supplied to a phase modulator 303 which receives a modulating signal from the modulation generator 107. An example of a conventional phase modulator circuit is shown in FIG. 9. Techniques for phase modulating a signal are well known to those having ordinary skill in the art, and are not described here in greater detail. The modulating signal is determined as described above with respect to FIG. 1. The output of the phase modulator 303 is then supplied to the interfering part 103. With this configuration, the modulated clock signals need be supplied only to those parts which create interfering signals. Other parts that do not create interference, or that do not tolerate a modulated signal, can receive the unmodulated clock signal as shown in the figure.

The use of phase modulation, as depicted in FIG. 3 is also applicable to the case where the oscillator 103 itself is responsible for generating the interfering signal. The phase modulated clock signal may be generally distributed to other parts in the apparatus. In this case, it may be necessary to additionally use commonly known design principles in order to reduce the interference that may emanate between the oscillator 103 and the phase modulator 303.

The embodiments described above have made reference to the use of a sinusoidal waveform as the modulating signal. However, one could also design a circuit based on the teachings presented here, but using a different deterministic, non-noise waveform, such as a square wave. As taught by, for example, P. F. Panther, "Modulation Noise and Spectral Analysis" 257–260 (McGraw Hill 1965), which is incorporated herein by reference, the Fourier series of a carrier that is frequency modulated by a square wave is given by $$e(t) = A_c \sum_{n=-\infty}^{\infty} \frac{2\beta}{\pi(\beta^2 - n^2)} \cdot \sin(\beta - n)\frac{\pi}{2} \cdot \cos(\omega_c + n\omega_m)t$$

$$= \frac{2A_c}{\pi\beta} \sin\frac{\pi\beta}{2} \cos\omega_c t + \qquad \text{(carrier)}$$

$$\frac{2\beta A_c}{\pi(\beta^2 - 1^2)} \cdot \cos\frac{\beta\pi}{2} [\cos(\omega_c - \omega_m)t - \cos(\omega_c + \omega_m)t] - \qquad \text{(first sideband pair)}$$

$$\frac{2\beta A_c}{\pi(\beta^2 - 2^2)} \cdot \sin\frac{\beta\pi}{2} [\cos(\omega_c - 2\omega_m)t + \cos(\omega_c + 2\omega_m)t] \qquad \text{(second sideband pair)}$$

By setting $\beta=2$ in the above equation, one finds that the amplitude of the carrier vanishes. In general, a modulation index, $\beta$, should be selected that satisfies the relation $(2/\pi\beta)\sin(\pi\beta/2) \leq R$, where R is a predetermined ratio of modulated carrier amplitude to unmodulated carrier amplitude. The exact value of R will depend upon requirements for the particular circuit being designed. Using a modulation with sufficiently large $\omega_m$ causes the sidebands to fall outside of the receiver bandwidth.

Thus in accordance with the above-described aspect of the invention, it is possible to avoid interference that would otherwise be difficult to avoid. Small and compact designs can be achieved at lower cost and weight, because less shielding and decoupling is necessary. Problems relating to the above-identified interference can be solved at a later stage in the development cycle of electronic equipment, which saves time. Furthermore, it is not only one frequency that is improved, but all frequencies where the modulation index is close enough to, for example, 2.4 to give the desired attenuation of the interference. This is important because interference from digital circuits is often in the form of harmonics of a relatively low clock frequency causing interference at several channels within the receiver tuning bandwidth.

In accordance with a second aspect of the invention, angle modulation is applied to a reference clock signal in electronic equipment in order to reduce unwanted electromagnetic emissions to levels that enable the electronic equipment to satisfy national and international standards regarding such emissions. As explained above, such standards set a maximum level of electromagnetic radiation that will be tolerated from electronic equipment.

Figure 4:
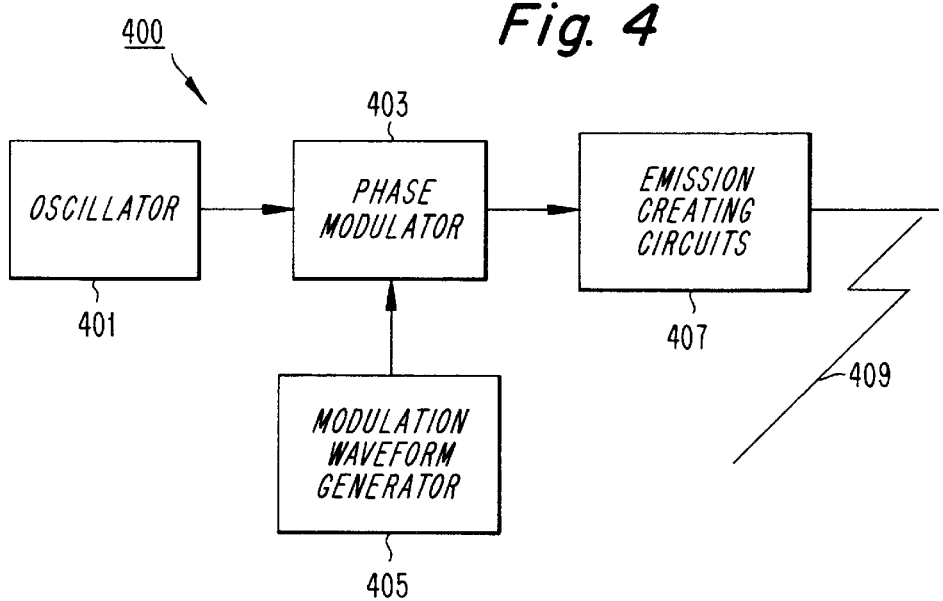
FIG. 4 is a block diagram of electronic equipment that includes an embodiment in accordance with a second aspect of the invention.

Referring now to FIG. 4, one embodiment of the invention is shown that addresses this problem. Here, electronic equipment 400 includes an oscillator 401 that provides a clock signal for use by emission creating circuits 407, which generate the interfering signal 409. In accordance with the invention, phase modulation is applied to the output of the oscillator 401 by means of a phase modulator 403. Alternatively, angle modulation could be achieved by means of direct application of frequency modulation to the oscillator 401, in the manner described above with respect to FIG. 1. The modulation waveform in either case is a deterministic, non-noise waveform, and preferably a sawtooth waveform, which in this embodiment is provided by the modulation waveform generator 405. The use of a deterministic, non-noise waveform signal, such as the sawtooth waveform, instead of a white noise signal provides advantages, including the fact that the modulating waveform is much simpler to generate. For example, a sawtooth waveform can be generated simply by integrating a constant voltage, and resetting the output periodically.

The effectiveness of this design derives from the fact that a sawtooth frequency modulated signal with a large modulation index has a spectrum with components of almost equal amplitude within the modulation frequency sweep width. Each spectral component of the modulated signal has a power level approximately corresponding to the ratio of the sawtooth modulation frequency to the sweep width.

This is because the spectral components are equally spaced at modulation frequency distances within the sweep width. The number of components within the sweep width is then equal to the ratio of the sweep width to the modulation frequency. The total signal power is essentially equally shared between the components, and each of them has a power correspondingly smaller. This spectrum is shown in FIGS. 7–11 on page 260 of the above-cited book by Panther, which has been incorporated herein by reference.

If this modulated spectrum is measured with a power measuring device having a bandwidth of B Hz and the modulation frequency is chosen to be larger than B, only one spectral component at a time is present within the power measuring device bandwidth anywhere in the modulation spectrum. The measuring device will thus show the power of only one of the components and a desired reduction is achieved.

When the measuring device is a peak power meter, it is an advantage to use a modulation spectrum with a constant amplitude component within the power measuring device bandwidth. The meter will then never show more than the peak level of each component, which is also equal to the average level, since the amplitude is constant. That means that a deterministic modulation with a flat spectrum, such as the sawtooth sweep, is better for this purpose than a random noise spectrum with an equal spectral average power within the measurement bandwidth, since the noise signal will have a much higher peak than average value. The peak power meter will show higher peak power for noise modulation than for sawtooth sweep modulation with comparable frequency deviation.

The choice of a sawtooth waveform having a frequency slightly higher than the measurement bandwidth is optimum in the sense that it gives smaller peak power in the measurement bandwidth than other choices. This is so because if the frequency is made even higher, then each component will be larger. On the other hand, if the frequency is made lower, then several components fall in the measurement bandwidth, which will add to higher peak power, even if the average power remains the same. Preferably, the frequency of the sawtooth waveform is selected from a range of frequency values, the range of frequency values having a low frequency value that is substantially equal to the measurement bandwidth and a high frequency value that is substantially equal to 1.5 times the measurement bandwidth.

Figure 7:
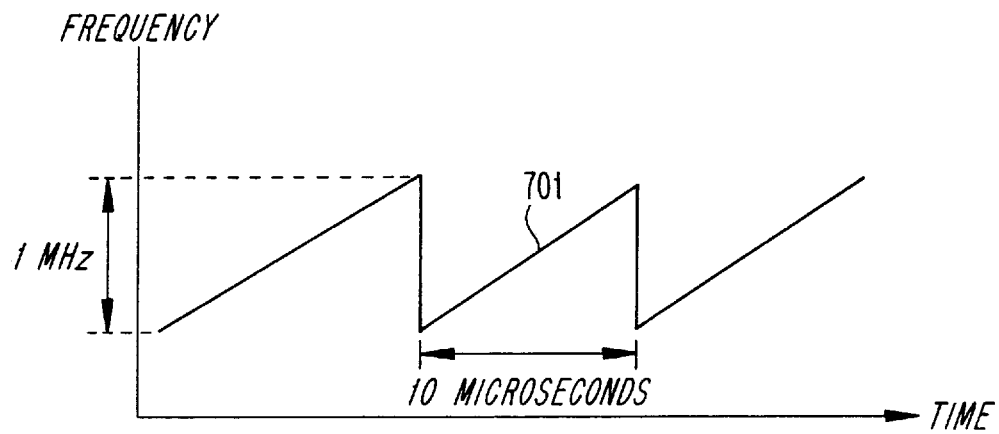
FIG. 7 is a graph of a clock signal that has been modulated by a sawtooth waveform in accordance with one embodiment of the present invention.

For the purpose of illustrating the above principles, assume that a power measuring device bandwidth is slightly less than 100 kHz and that it is desired to achieve a 10 dB (i.e., 10 times) reduction of spectral component levels in this bandwidth. In accordance with the inventive principles described above, a sawtooth modulation frequency of 100 kHz can be used. Also, the total signal power should be shared among 10 components in order to give the desired power reduction. To produce these 10 components, the clock signal should be angle modulated by a sawtooth waveform having a sweep width of 10×100 kHz=1 MHz. The frequency variation of a modulated clock signal 701 that has been modulated with the described sawtooth waveform is shown in FIG. 7.

The above teachings will now be applied to an example with reference to the circuit of FIG. 4. If the electronic equipment 400 is, for example, a personal computer, then the clock frequency might by 66 MHz. Assume that it is desired to avoid interference occurring around 900 MHz. A frequency sweep of 1 MHz of the 900 MHz components requires sweeping the 66 MHz clock signal over (66/900)×1 MHz=73.3 kHz.

Figure 5A:
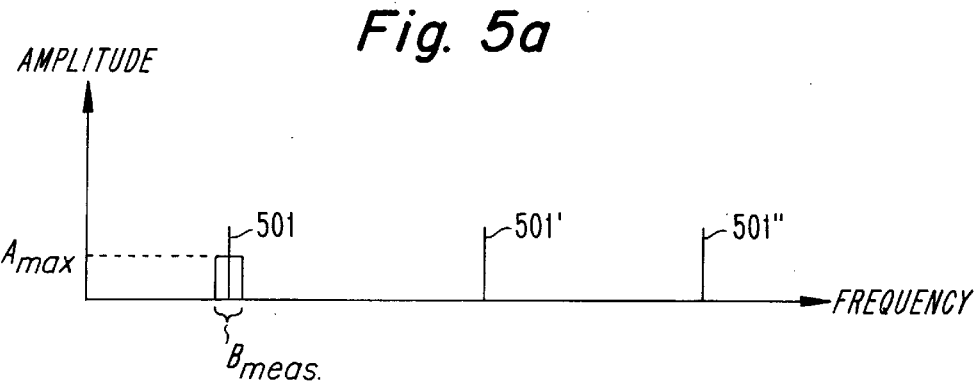
FIGS. 5a–b are graphical comparisons of emission levels produced by a circuit with and without the use of techniques in accordance with the second aspect of the invention.
Figure 5B:
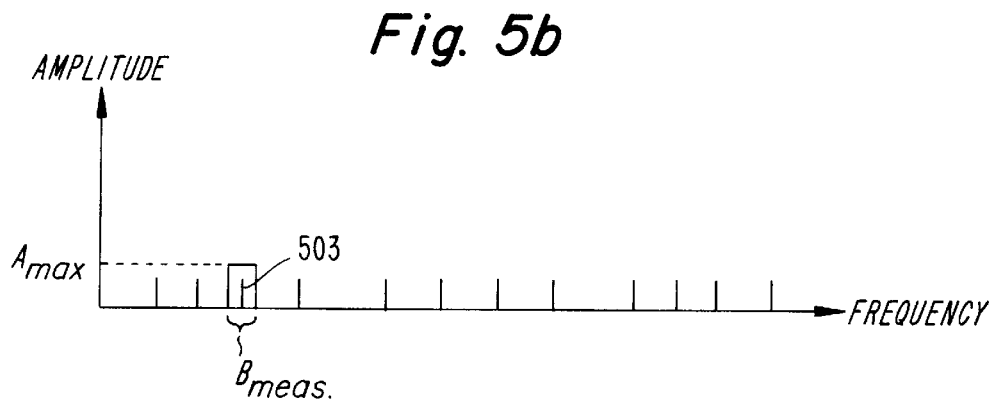

The effectiveness of this design is illustrated in FIGS. 5a and 5b. FIG. 5a shows a graph of the line spectrum of the interfering signal 409 that would ordinarily result from direct application of the output of the oscillator 401 to the input of the emission creating circuits 407. It can be seen that the interfering signal 409 in this instance comprises three lines 501, 501', 501". The first line 501 falls within the bandwidth $B_{meas.}$ in which an electromagnetic emission measurement is to be made. Without the use of the present invention, the amplitude of the first line 501 exceeds the maximum allowable amplitude $A_{max}$ set by national and/or international standards.

By comparison, FIG. 5b shows the effect of applying the sawtooth frequency sweep waveform modulation to the output of the oscillator 401. Here, the interfering signal 409 comprises twelve lines spaced across the frequency spectrum. However, only the third line 503 falls within the bandwidth $B_{meas.}$ in which an electromagnetic emission measurement is to be made. Of significance is the fact that the amplitude of this third line 503 is less than the maximum allowable amplitude $A_{max}$ set by national and/or international standards. Thus, the electronic equipment 400 would satisfy these requirements. In effect, by applying angle modulation to the output of the oscillator 401, the lines of the line spectrum are spread out so that less power falls within any one bandwidth, including the one in which a detector performs its emission measurements. It should be noted that this technique does not cheat the test method, because the test method gives a good measure of the interference that is created. That is, the smaller the measured emission, the smaller will be the actual interference created by the emission in the radio receiver that the test method simulates.

Figure 6:
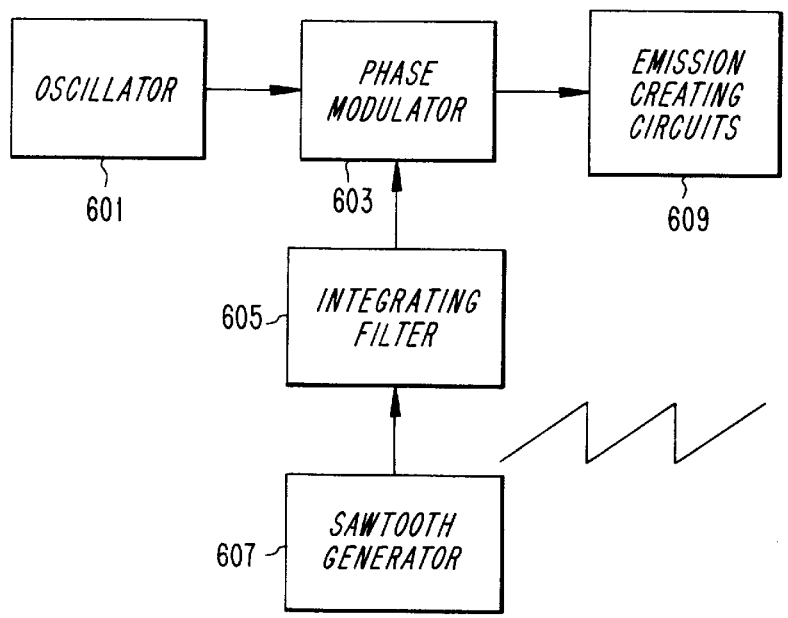
FIG. 6 is a block diagram of still another embodiment in accordance with the second aspect of the invention.

Another embodiment of the invention will now be described with reference to FIG. 6. Here, the electronic equipment 600 comprises digital logic circuits, including the emission creating circuits 609. A clock signal for use by the emission creating circuits 609 is derived from the output of an oscillator 601, which may typically be a crystal oscillator having a sinusoidal output. In accordance with the invention, the output of the oscillator 601 is supplied to a phase modulator 603. The modulating signal is derived from a sawtooth waveform generator 607, designs for which are well-known to those having ordinary skill in the art of electronics, and are not described here further. The output of the sawtooth generator 607 is supplied to the input of an integrating filter 605, the output of which is supplied to the phase modulator 603. The purpose of the integrating filter 605 is to ensure that the output of the phase modulator is the same as what one would produce by directly frequency modulating the oscillator 601 with the output of the sawtooth generator 607.

Thus, this aspect of the present invention provides for relatively large attenuations of unwanted emission to be achieved. This permits costs for decoupling and screening to be reduced. The configuration shown in FIGS. 4 and 6 are well suited for integration in clock circuits and processors.

Empirical results of tests in which the various inventive techniques are applied will now be described with reference to the graphs depicted in FIGS. 8a–8d. Each of these graphs was produced by a Hewlett Packard Spectrum Analyzer, Model No. 8568 B. The following examples do not use the same bandwidths, modulation frequencies and deviations as the previously described examples. However, frequency scaling does not influence the results, so the relations depicted below are valid in general.

Figure 8A:
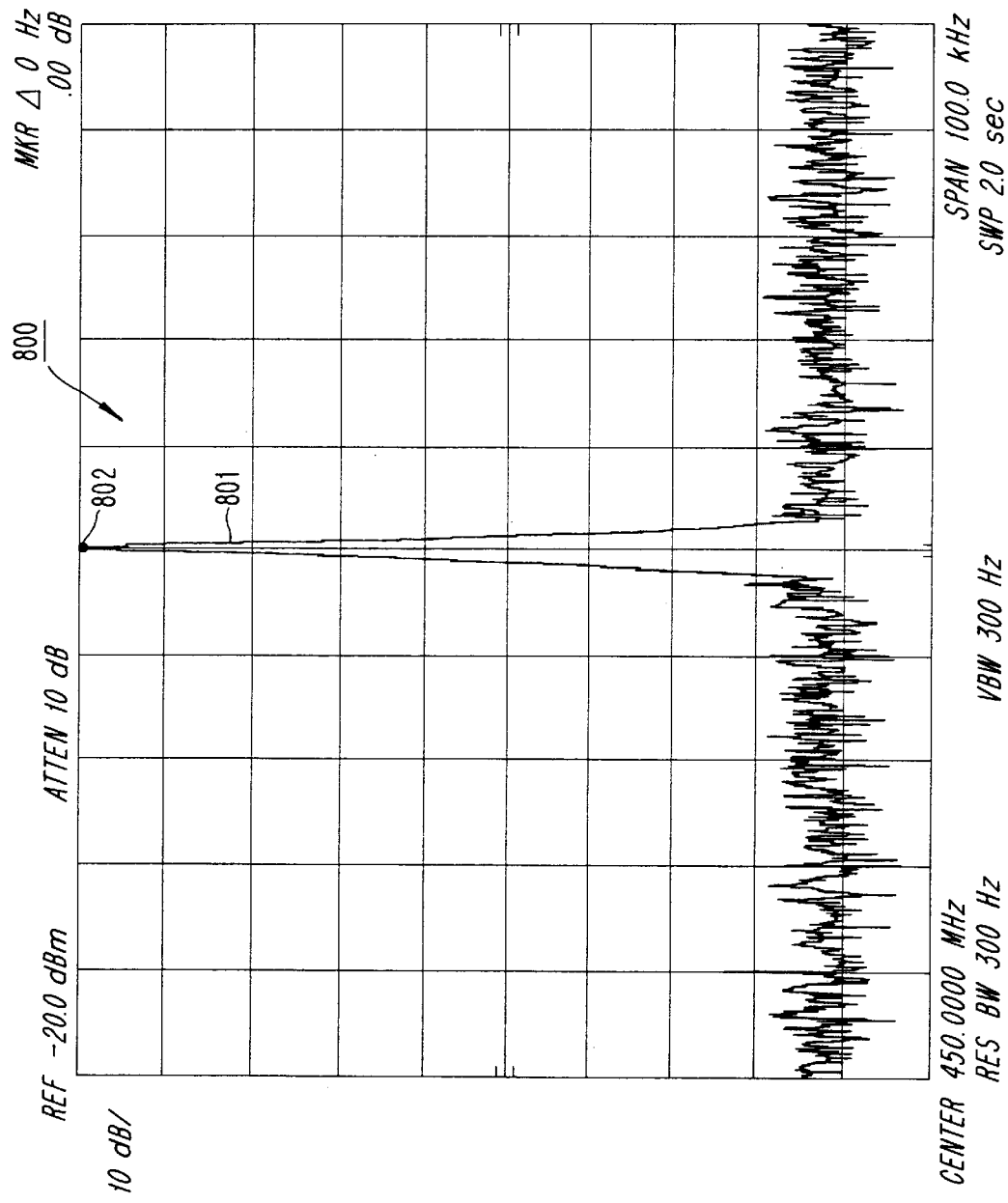
FIGS. 8a–d are graphs showing empirical results of tests in which the various inventive techniques are applied.

Referring now to FIG. 8a, an interfering signal 800 represents a harmonic from an unmodulated clock signal (not shown). In particular, the interfering signal 800 includes a large interfering spectral component 801 centered around 450 MHz. The peak 802 of the interfering spectral component 801 is −20 dBm in this example.

Figure 8B:
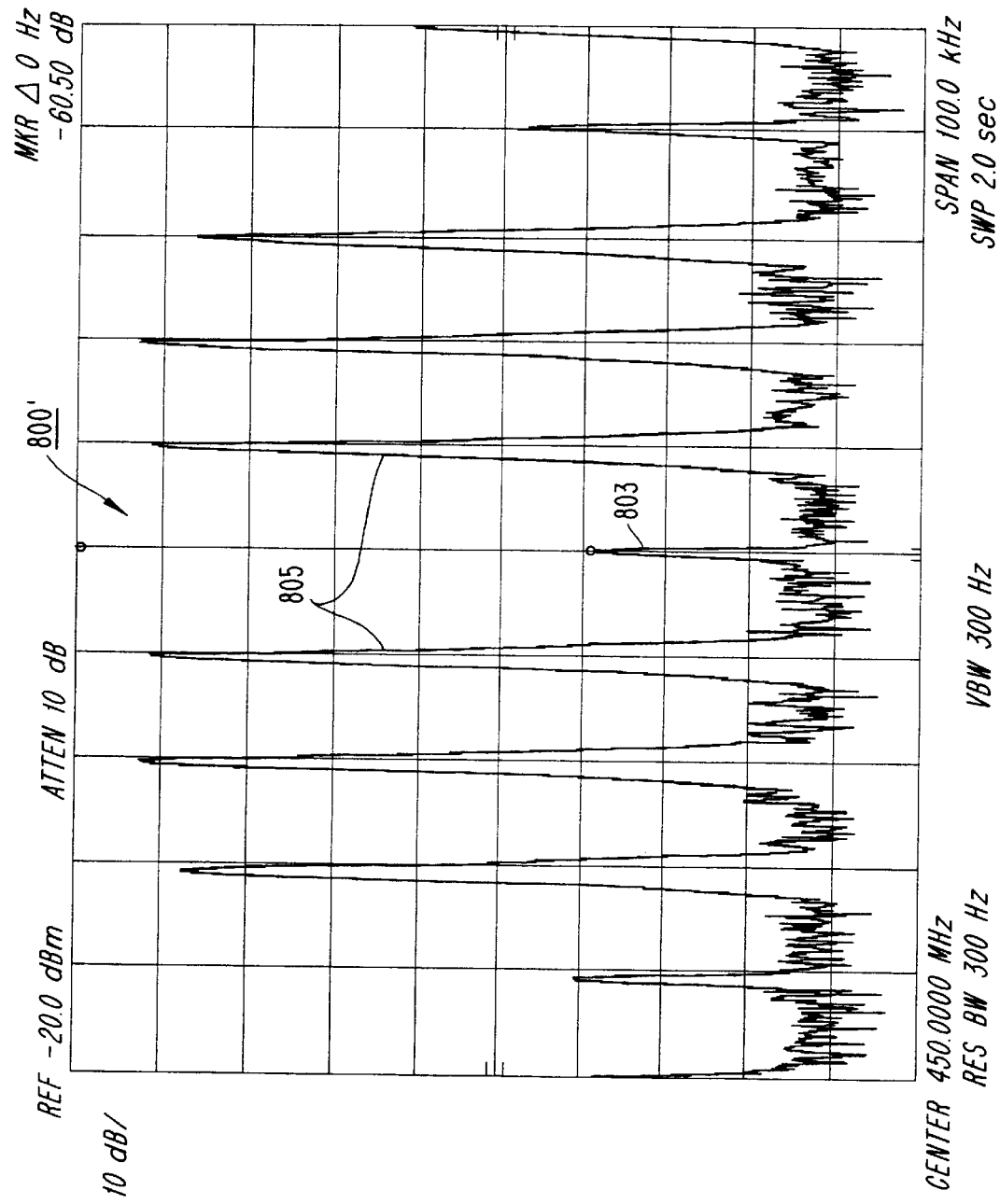

If it is desired to significantly attenuate the interfering spectral component 801, in order to virtually eliminate interference within a receiver bandwidth centered around 450 MHz, then the unmodulated clock signal may be frequency modulated with a 10 kHz square wave and a modulation index at the interfering 450 MHz component approximately equal to 2. The effect that this has on the interfering signal is depicted in the graph of FIG. 8b. Here, the interfering signal 800' has an interfering spectral component 803 that represents an attenuation of more than 60 dB compared to the interfering spectral component 801. Furthermore, the sidebands 805 that are generated by application of this technique are 10 kHz away from the 450 MHz receiver center frequency, and are therefore outside of the receiver bandwidth.

Figure 8C:
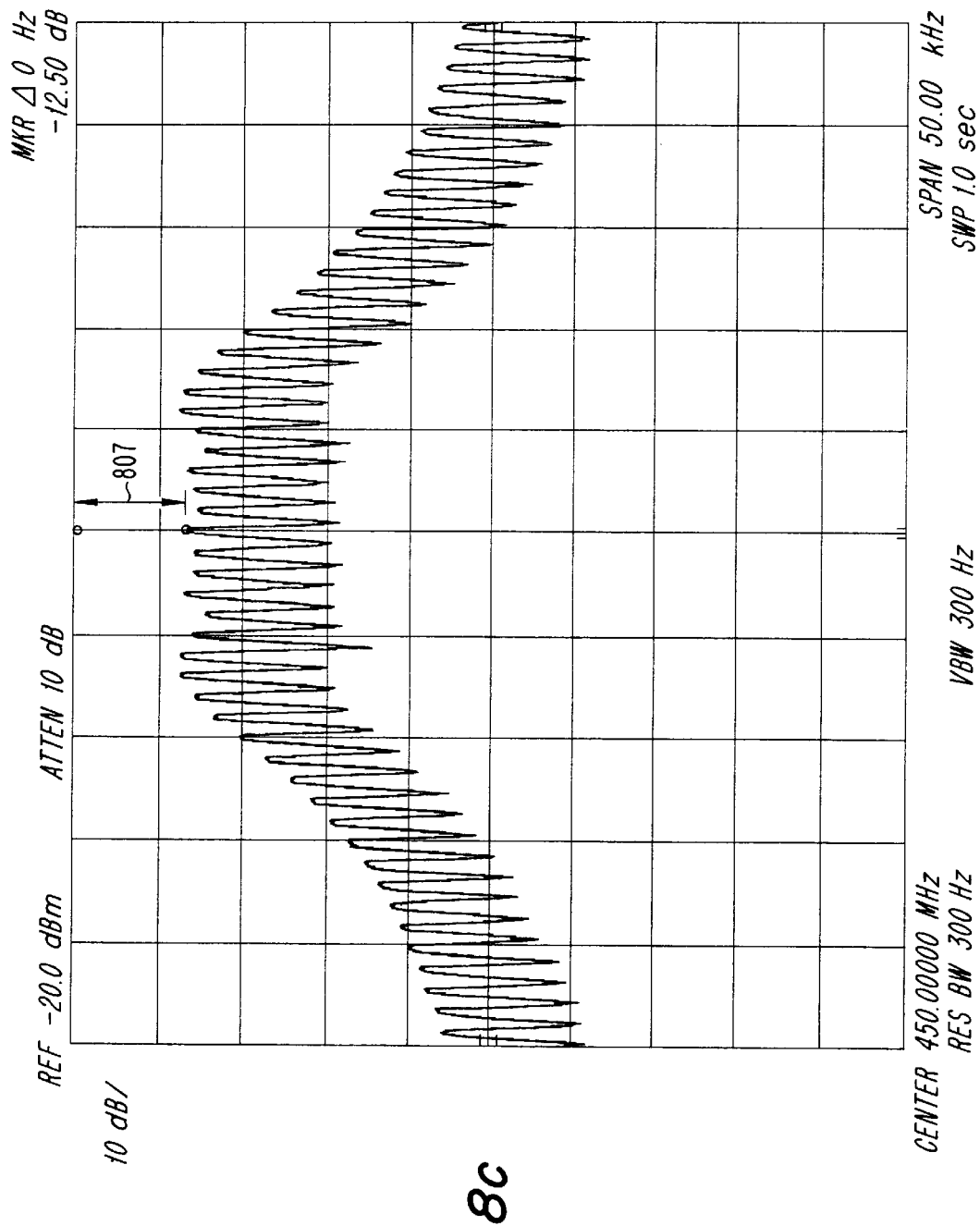

FIG. 8c is a graph showing the effect of frequency modulating a clock signal (not shown) with a 1 kHz sawtooth waveform having a sweep width of 20 kHz at the interfering component frequency. This should result in the signal power being shared by approximately 20 components, so that attenuation should be approximately 20 times, or −13 dB. This is in good agreement with the actual attenuation 807 of −12.5 dB, as shown in FIG. 8c. The measurement bandwidth used to generate the graph in FIG. 8c is 300 Hz, which is smaller than the distance between the components. Thus, at most only one component could be measured at a time. This is also a peak power measurement. There is no difference between peak and average power because there is only a constant amplitude signal present in the measurement bandwidth.

Figure 8D:
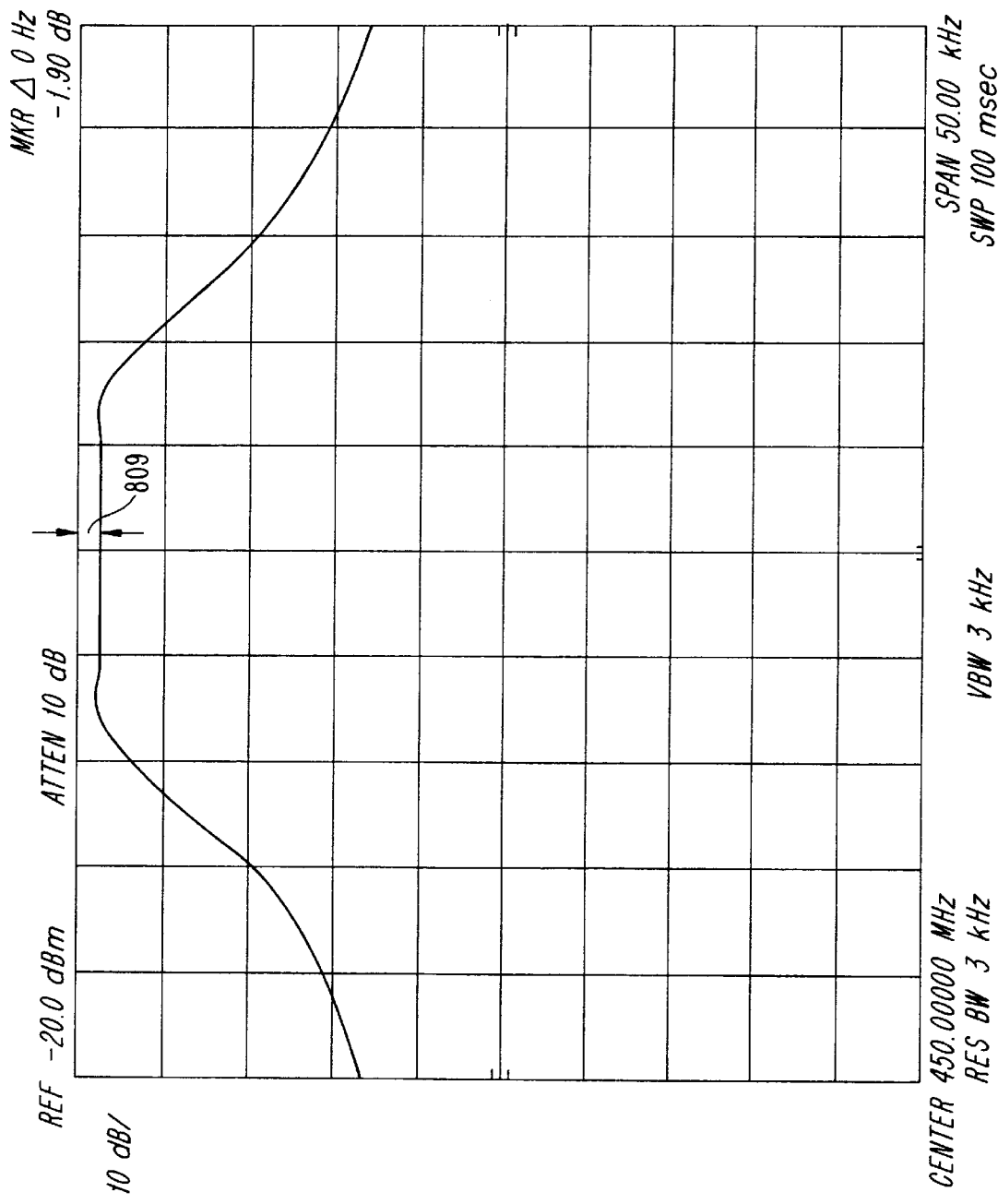

Referring now to FIG. 8d, the same spectrum as shown in FIG. 8c is again depicted. However, here the interfering signal has been measured with a bandwidth of 3 kHz, thereby allowing 3 components in the bandwidth. This is a peak power measurement. A rough calculation predicts that the peak value of the voltage measured should rise 3 times, corresponding to 9.5 dB, compared to the measurement in FIG. 8c. The actual attenuation 809 (−1.9 dB actual≈−12.5 dB actual+9.5 dB estimate) is in good agreement with this estimate.

The invention has been described with reference to a particular embodiment. However, it will be readily apparent to those skilled in the art that it is possible to embody the invention in specific forms other than those of the preferred embodiments described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. In an electronic apparatus including an interfering part that generates, from a first signal, an interference signal having a spectral component within a receiver bandwidth, a method for reducing interference within the receiver bandwidth, comprising the step of:

angle modulating the first signal with a deterministic, non-noise modulating signal, whereby an angle modulated interference signal having modulation sidebands that are completely outside of the receiver bandwidth and a reduced carrier amplitude is generated by the interfering part, wherein the deterministic, non-noise modulating signal is a sinusoidal signal, and wherein the angle modulated interference signal has a modulation index, $\beta$, that satisfies a relation $J_0(\beta) \leq R$, where R is a predetermined ratio of modulated carrier amplitude to unmodulated carrier amplitude.

2. In an electronic apparatus including an interfering part that generates, from a first signal, an interference signal having a spectral component within a receiver bandwidth, a method for reducing interference within the receiver bandwidth, comprising the step of:

angle modulating the first signal with a deterministic, non-noise modulating signal, whereby an angle modulated interference signal having modulation sidebands that are completely outside of the receiver bandwidth and a reduced carrier amplitude is generated by the interfering part, wherein the deterministic, non-noise modulating signal is a symmetrical square wave, and wherein the symmetrical square wave has a repetition frequency high enough to cause modulation sidebands of the angle modulated interference signal to fall outside of the receiver bandwidth.

3. In an electronic apparatus including an interfering part that generates, from a first signal, an interference signal having a spectral component within a receiver bandwidth, a method for reducing interference within the receiver bandwidth, comprising the step of:

angle modulating the first signal with a deterministic, non-noise modulating signal, whereby an angle modulated interference signal having modulation sidebands that are completely outside of the receiver bandwidth and a reduced carrier amplitude is generated by the interfering part, wherein the deterministic, non-noise modulating signal is a symmetrical square wave, and wherein the angle modulated interference signal has a modulation index, $\beta$, that satisfies a relation $(2/\pi\beta)\sin(\pi\beta/2) \leq R$, where R is a predetermined ratio of modulated carrier amplitude to unmodulated carrier amplitude.

4. In an electronic apparatus including an interfering part that generates a combined signal comprising a first signal and an interference signal having a spectral component within a receiver bandwidth, a method for reducing interference within the receiver bandwidth, comprising the step of:

angle modulating the combined signal with a deterministic, non-noise modulating signal, whereby the interfering part generates an angle modulated interference signal having modulation sidebands that are completely outside of the receiver bandwidth and a reduced carrier amplitude, wherein the deterministic, non-noise modulating signal is a sinusoidal signal, and wherein the angle modulated interference signal has a modulation index, $\beta$, that satisfies a relation $J_0(\beta) \leq R$, where R is a predetermined ratio of modulated carrier amplitude to unmodulated carrier amplitude.

5. In an electronic apparatus including an interfering part that generates a combined signal comprising a first signal and an interference signal having a spectral component within a receiver bandwidth, a method for reducing interference within the receiver bandwidth, comprising the step of:

angle modulating the combined signal with a deterministic, non-noise modulating signal, whereby the interfering part generates an angle modulated interference signal having modulation sidebands that are completely outside of the receiver bandwidth and a reduced carrier amplitude, wherein the deterministic, non-noise modulating signal is a symmetrical square wave, and wherein the symmetrical square wave has a repetition frequency high enough to cause modulation sidebands of the angle modulated interference signal to fall outside of the receiver bandwidth.

6. In an electronic apparatus including an interfering part that generates a combined signal comprising a first signal and an interference signal having a spectral component within a receiver bandwidth, a method for reducing interference within the receiver bandwidth, comprising the step of:

angle modulating the combined signal with a deterministic, non-noise modulating signal, whereby the interfering part generates an angle modulated interference signal having modulation sidebands that are completely outside of the receiver bandwidth and a reduced carrier amplitude, wherein the deterministic, non-noise modulating signal is a symmetrical square wave, and wherein the angle modulated interference signal has a modulation index, $\beta$, that satisfies a relation $(2/\pi\beta)\sin(\pi\beta/2) \leq R$, where R is a predetermined ratio of modulated carrier amplitude to unmodulated carrier amplitude.

7. In an electronic apparatus including an interfering part that generates, from a first signal, an interference signal having an interfering spectral component within a measurement bandwidth, a method for reducing interference within the measurement bandwidth, comprising the step of:

using a modulating signal to angle modulate the first signal, whereby the interfering part generates an angle modulated interference signal having a reduced spectral component within the measurement bandwidth, the reduced spectral component being smaller than the interfering spectral component, wherein:
the modulating signal is a deterministic, non-noise waveform, and
a modulation bandwidth of the angle modulated interference signal exceeds the measurement bandwidth, and wherein the modulating signal is a sawtooth waveform, and wherein the frequency of the sawtooth waveform is selected from a range of frequency values, the range of frequency values having a low frequency value that is substantially equal to the measurement bandwidth and a high frequency value that is substantially equal to 1.5 times the measurement bandwidth.

8. The method of claim 7, wherein the step of angle modulating the first signal comprises the steps of:

applying direct frequency modulation to a first part that generates the first signal; and supplying the frequency modulated first signal to an emission generating circuit within the interfering part in lieu of the first signal, the emission generating circuit being responsible for generation of the interference signal.

9. The method of claim 7, wherein the step of angle modulating the first signal comprises the steps of:

phase modulating the first signal; and supplying the phase modulated first signal to an emission generating circuit within the interfering part in lieu of the first signal, the emission generating circuit being responsible for generation of the interference signal.

10. The method of claim 9, further comprising the step of supplying the unmodulated first signal to a non-interfering part of the electronic apparatus.

11. In an electronic apparatus including an interfering part that generates a combined signal comprising a first signal and an interference signal having an interfering spectral component within a measurement bandwidth, a method for reducing interference within the measurement bandwidth, comprising the step of:

using a modulating signal to angle modulate the combined signal, whereby an angle modulated interference signal is generated having a reduced spectral component within the measurement bandwidth, the reduced spectral component being smaller than the interfering spectral component, wherein:

the modulating signal is a deterministic, non-noise waveform, and a modulation bandwidth of the angle modulated interference signal exceeds the measurement bandwidth, and wherein the modulating signal is a sawtooth waveform, and wherein the frequency of the sawtooth waveform is selected from a range of frequency values, the range of frequency values having a low frequency value that is substantially equal to the measurement bandwidth and a high frequency value that is substantially equal to 1.5 times the measurement bandwidth.

12. The method of claim 11, wherein the step of angle modulating the combined signal comprises applying direct frequency modulation to the interfering part.

13. The method of claim 11, wherein the step of angle modulating the combined signal comprises phase modulating the combined signal; and further comprising the step of supplying, in lieu of the combined signal, the phase modulated combined signal to a first component in the electronic apparatus.

* * * * *